(12) United States Patent
Culbertson et al.

(10) Patent No.: US 6,373,487 B1
(45) Date of Patent: Apr. 16, 2002

(54) METHODS AND APPARATUS FOR CONSTRUCTING A 3D MODEL OF A SCENE FROM CALIBRATED IMAGES OF THE SCENE

(75) Inventors: W. Bruce Culbertson; Thomas Malzbender, both of Palo Alto, CA (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/398,489

(22) Filed: Sep. 17, 1999

(51) Int. Cl.[7] .............................................. G06T 17/00
(52) U.S. Cl. ...................................... 345/424; 382/132
(58) Field of Search ................................. 345/424, 419, 345/582, 422, 421, 427; 382/154, 132

(56) References Cited

U.S. PATENT DOCUMENTS

| | | | | |
|---|---|---|---|---|
| 5,218,534 A | * | 6/1993 | Trousset et al. | 345/424 |
| 6,232,979 B1 | * | 5/2001 | Shochet | 345/430 |
| 6,243,098 B1 | * | 6/2001 | Lauer et al. | 345/424 |
| 6,249,600 B1 | * | 6/2001 | Reed et al. | 382/154 |

OTHER PUBLICATIONS

Levoy et al, "Light Field Rendering", Proceedings SIG-GRAPH 1996, pp. 31–42.

Gortler et al, "The Lumigraph", Proceedings SIGGRAPH 1996, pp. 43–54.

Shum et al, "Rendering with Concentric Mosaics", Computer Graphics Proc., Annual Conf. Series, 1999, pp. 299–306.

W. Eric L. Grimson, "Computational Experiments with a Feature Based Stereo Algorithm", IEEE Transactions on Pattern Analysis & Machine Intelligence, vol. PAMI–7, No. 1, Jan. 1985, pp. 17–34.

Okutomi et al, "A Multiple–Baseline Stereo", IEEE Trans. on Pattern Analysis and Machine Intelligence, vol. 15, No. 4, Apr. 1993, pp. 353–363.

Narayanan et al, "Constructing Virtual Worlds Using Dense Stereo",Sixth International Conf. on Computer Vision, 1998, pp. 3–10.

Roy et al, "A Maximum–Flow Formulation of the N–camera Stereo Corresponding Problem", IEEE Proc of Int. Conf. on Computer Vision, Bombai, Jan. 1998, pp.

Szeliski et al, "Stereo Matching with Transparency and Matting", ICCV 1998, pp. 517–524.

Faugeras et al, "Complete Dense Stereovision Using Level Set Methods", ECCV 1998.

Saito et al, "Shape Reconstruction in Projective Grid Space from Large Number. of Images", IEEE, 1999, pp. 49–54.

(List continued on next page.)

*Primary Examiner*—Mark Zimmerman
*Assistant Examiner*—Huedung X. Cao

(57) ABSTRACT

Methods and apparatus are provided for volumemetric scene reconstruction. Given a set of images of the scene taken from arbitrary but known locations, a 3D model of the scene is reconstructed. Voxels are used to model the scene and exploit the fact that surface points in the scene, and the voxels that represent them, project to consistent colors in the input images. Input cameras may be placed at arbitrary locations in and around the scene. When checking the color consistency of a voxel, the entire set of images from which the voxel is visible is used. A GVC algorithm utilizes item buffers which contain, for each pixel in each image, the ID of the closest voxel that projects onto to the pixel. A GVC-LDI algorithm uses layered depth images which store at each pixel location a list of all the surface voxels that project onto the pixel, sorted according to the distance of the voxel from the image's camera.

14 Claims, 14 Drawing Sheets

OTHER PUBLICATIONS

Shade et al, "Layered Depth Images", Computer Graphics Proc., Annual Conf. Series 1998, pp. 231–242.

Weghorst et al, "Improved Computational Methods for Ray Tracing", ACM Transactions on Graphics, vol. 3, No. 1, Jan. 1984, pp. 52–69.

Max, N., "Hierarchical Rendering of Trees from Precomputed Multi–Layer Z–Buffers", Eurographics Rendering Workshop, 1996, pp. 165–174.

Seitz et al, "Photorealistic Scene Reconstruction by Voxel Coloring", In Proc. Comp. Vision & Pattern Recognition Conf., 1997, pp. 1067–1073.

Kutulakos et al, "What Do N Photographs Tell Us About 3D Shape?,", TR680, Computer Science Dept. U. Rochester Jan., 1998, pp. 1–8.

Seitz et al, "View Morphing", Proceedings SIGGRAPH 1996, pp. 21–30.

* cited by examiner

```
/* The basic GVC algorithm */
initialize SVL
initialize item buffers by rendering voxels on SVL
for every voxel V
   carved(V) = false
loop {
   visibilityChanged = false
   NewSVL = empty
   for every voxel V ∈ SVL {
      compute vis(V)
      if (consist(vis(V)) = false) {
         visibilityChanged = true
         carved(V) = true
         remove V from SVL
         for all voxels N that are adjacent to V
            if (carved(N) = false and N ∉ SVL)
               add N to NewSVL
      }
   }
   if (visibilityChanged = false) {
      save voxel space
      quit
   }
   for every N ∈ NewSVL
      if (N ∉ SVL)
         append N to SVL
   update item Buffers by rendering voxels on SVL
}
```

Fig. 2A

```
/* GVC-LDI algorithm */
initialize SVL
render SVL to LDIs
for every voxel V
    carved(V) = false
copy SVL to CVSVL
while (CVSVL is not empty) {
    delete V from CVSVL
    compute vis(V)
    if (consist(vis(V)) = false) {
        carved(V) = true
        remove V from SVL
        for every pixel P in projection of V into all images {
            if (V is head of LDI(P))
                add next voxel on LDI(P) (if any) to CVSVL
            delete V from LDI(P)
        }
        for every voxel N adjacent to V with N ∉ SVL {
            N_is_visible = false
            for every pixel P in projection of N to all images {
                add N to LDI(P)
                if (N is head of LDI(P))
                    N_is_visible = true
            }
            add N to SVL
            if (N_is_visible)
                add N to CVSVL
        }
    }
}
save voxel space
```

Fig. 8A

METHODS AND APPARATUS FOR CONSTRUCTING A 3D MODEL OF A SCENE FROM CALIBRATED IMAGES OF THE SCENE

FIELD OF THE INVENTION

This invention relates to methods and apparatus for volumetric scene reconstruction from a set of input images of the scene and, more particularly, to methods and apparatus for reconstructing a high quality 3D model of the scene that is consistent with the input images.

BACKGROUND OF THE INVENTION

Currently, there is a great deal of interest in image-based rendering techniques. These methods draw from the fields of computer graphics, computer vision, image processing and photogrammetry. The goal of these methods is to compute new views from two or more images of a scene, be they natural or synthetic. Several images of a scene are acquired from different camera viewpoints. The image data is used to create a three-dimensional (3D) computer model of the scene. The 3D model can then be used to compute one or more images of the scene from viewpoints that are different from the camera viewpoints. The new image is synthesized by projecting the 3D model to the desired viewpoint. These techniques may be referred to as "new view synthesis." A number of new view synthesis techniques have been disclosed in the prior art.

View morphing and light fields are solutions to the new view synthesis problem that do not create a 3D model as an intermediate step. View morphing is one of the simplest solutions to the problem. Given two images of a scene, it uses interpolation to create a new image intermediate in viewpoint between the input images. Because view morphing uses no 3D information about the scene, it cannot in general render images that are strictly correct, although the results often look convincing. Most obviously, the algorithm has limited means to correctly render objects in the scene that occlude one another.

Lumigraph and light field techniques use a sampling of the light radiated in every direction from every point on the surface of a volume. In theory, such a collection of data can produce nearly perfect new views. In practice, however, the large amount of input data required to synthesize high quality images is impractical to capture and store. Nevertheless, these methods have one advantage over nearly all competing approaches: they treat specular reflections correctly.

Stereo techniques find points in two or more input images that correspond to the same point in the scene. They then use knowledge of the camera locations and triangulation to determine the depth of the scene point. Unfortunately, stereo is difficult to apply to images taken from arbitrary viewpoints. If the input viewpoints are far apart, then corresponding image points are hard to find automatically. On the other hand, if the viewpoints are close together, then small measurement errors result in large errors in the calculated depths. Furthermore, stereo naturally produces a 2D depth map, and integrating many such maps into a true 3D model is a challenging problem.

Voxel coloring and space carving exploit a characteristic of lambertian surfaces: points on such surfaces are "color consistent", i.e., they project onto similar colors in all the images from which they are visible. These methods start with an arbitrary number of calibrated images of the scene and a set of volume elements, or voxels, that is a superset of the scene. Each voxel is projected into all the images from which it is visible. If the voxel projects onto inconsistent colors in several images, it must not be on a surface, and so it is "carved", i.e., declared to be transparent. Otherwise, the voxel is "colored", i.e., declared to be opaque and assigned the color of its projections. These algorithms stop when all the opaque voxels project into consistent colors in the images. Because the final set of opaque voxels is color consistent, it is a good model of the scene.

Voxel coloring and space carving differ in the way they determine visibility, the knowledge of which voxels are visible from which pixels in the images. A voxel fails to be visible from an image if it projects outside the image or if it is blocked by other voxels that are currently considered to be opaque. When the opacity of a voxel changes, the visibility of other voxels potentially changes, so an efficient technique is needed to keep the visibility up-to-date.

Voxel coloring places constraints on the camera locations to simplify the visibility computation. It requires the cameras to be placed in such a way that the voxels can be processed, on a single scan, in front-to-back order relative to every camera. Typically, this condition is met by placing all the cameras on one side of the scene and scanning voxels in planes that are successively farther from the cameras. Thus, the transparency of all voxels that might occlude a given voxel is determined before the given voxel is checked for color consistency. Although it simplifies the visibility computation, the restriction on camera locations is a significant limitation. For example, the cameras cannot surround the scene, so some surfaces will not be visible in any image and hence cannot be reconstructed.

Space carving removes the restriction on camera locations. With the cameras placed arbitrarily, no single scan of the voxels, regardless of its order, will enable each voxel's visibility in the final model (and hence its color consistency) to be computed correctly. Algorithms have been designed that evaluate the consistency of voxels multiple times during carving, using changing and incomplete visibility information, and yet yield a color consistent reconstruction at the end. Space carving initially considers all voxels to be opaque and only changes voxels to transparent, never the reverse. Consequently, as some voxels are carved, the remaining opaque voxels can only become more visible from the images. The consistency function is assumed to be monotonic, meaning that for any two sets of pixels S and S', where S is a subset of S', if S is inconsistent, then S' is also inconsistent. Given that the visibility of a voxel only increases as the algorithm runs and the consistency function is monotonic, it follows that carving is conservative, and no voxel will ever be carved if it would be color consistent in the final model.

Space carving scans voxels for color consistency similarly to voxel coloring, evaluating a plane of voxels at a time. It forces the scans to be front-to-back, relative to the cameras, by using only images whose cameras are currently behind the moving plane. Thus, when a voxel is evaluated, the transparency is already known of other voxels that might occlude it from the cameras currently being used. Unlike voxel coloring, space carving uses multiple scans, typically along the positive and negative directions of each of the three axes. Because carving is conservative, the set of opaque voxels is a shrinking superset of the desired color consistent model as the algorithm runs.

While space carving never carves voxels that it should not, it is likely to produce a model that includes some color inconsistent voxels. During scanning, cameras that are ahead of the moving plane are not used for color consistency checking, even when the voxels being checked are visible from those cameras. Hence, the color consistency of a voxel is, in general, never checked over the entire set of images from which it is visible.

Accordingly, there is a need for improved methods and apparatus for reconstructing a 3D model of a scene from calibrated images of the scene.

SUMMARY OF THE INVENTION

According to a first aspect of the invention, methods and apparatus are provided for reconstructing a three-dimensional model of a scene from a plurality of images of the scene taken from different viewpoints. The method comprises the steps of a) defining a reconstruction volume comprising a set of voxels that include the scene, b) initializing a surface voxel list (SVL) that includes uncarved voxels on the surface of the reconstruction volume, c) creating item buffers that contain, for each pixel in each of the images, the ID of the closest voxel that projects onto the pixel, d) processing each voxel V in the SVL, e) if any voxels have been carved since the step of creating the item buffers, repeating steps c) and d), and f) if no voxels have been carved since the step of creating the item buffers, saving the SVL. Each voxel V in the SVL is processed by d1) computing the set of pixels vis(V) in all the images from which voxel V is visible, d2) determining the color consistency of vis(V), and d3) if vis(V) is not color consistent, i) carving voxel V, ii) removing voxel V from the SVL, and iii) adding to the SVL all uncarved voxels and that are adjacent to voxel V and that are not on the SVL.

According to another aspect of the invention, methods and apparatus are provided for reconstructing a three-dimensional model of a scene from a plurality of images of the scene taken from different viewpoints. The method comprises the steps of a) defining a reconstruction volume comprising a set of voxels that include the scene, b) initializing a surface voxel list (SVL) that includes uncarved voxels on the surface of the reconstruction volume, c) creating layered depth images (LDIs) that contain, for each pixel in each of the images, a list of all surface voxels that project onto the pixel, sorted according to distance from the voxel to the image's camera, d) copying the SVL to a changed visibility SVL (CVSVL), e) processing voxels in the CVSVL, and f) when the CVSVL is empty, saving the SVL. The processing of voxels in the CVSVL includes, while there are voxels in the CVSVL: e1) selecting a voxel V on the CVSVL and removing voxel V from the CVSVL, e2) computing the set of pixels vis(V) in all the images from which voxel V is visible, e3) determining the color consistency of vis(V), and e4) if vis(V) is not color consistent, i) carving voxel V, ii) removing voxel V from the SVL, iii) deleting voxel V from the LDIs, iv) if voxel V is at the head of LDI(P), adding the next voxel on LDI(P) to the CVSVL, and v) processing each uncarved voxel N that is adjacent to voxel V by adding voxel N to the CVSVL if its visibility has changed and inserting voxel N into the LDIs.

BRIEF DESCRIPTION OF THE DRAWINGS

For a better understanding of the present invention, reference is made to the accompanying drawings, which are incorporated herein by reference and in which:

FIG. 2A shows pseudo code for the generalized voxel coloring algorithm of the first embodiment and corresponds generally to the flow chart of FIG. 2;

FIG. 8A shows pseudo code for the generalized voxel coloring algorithm of the second embodiment and corresponds generally to the flow chart of FIG. 8;

DETAILED DESCRIPTION

Figure 1:
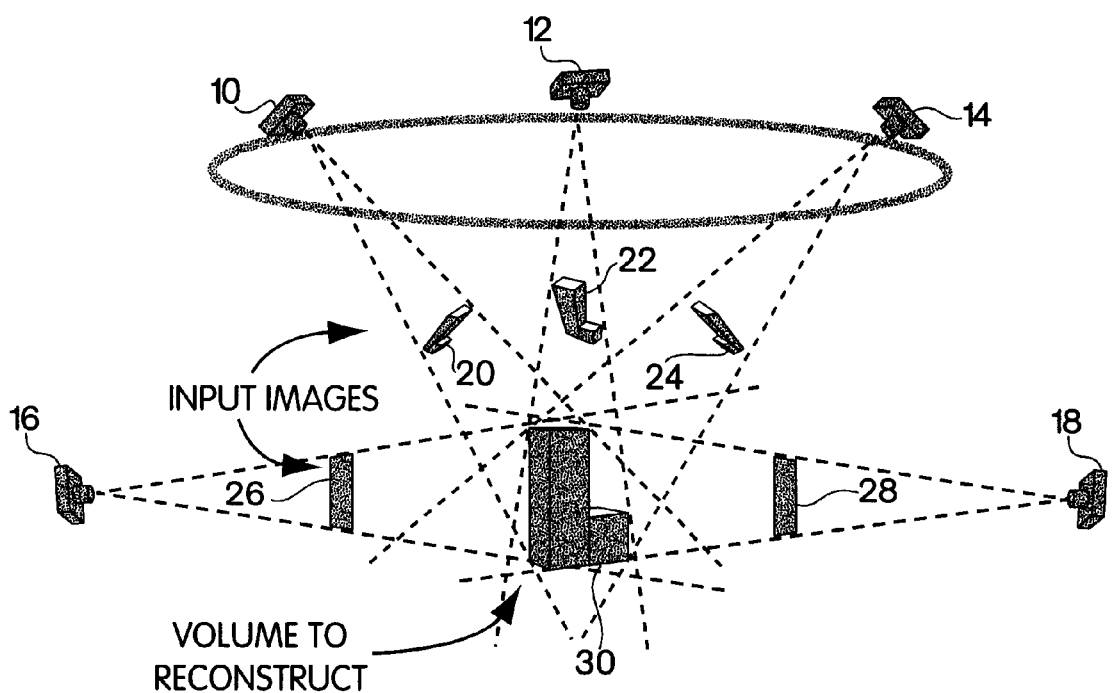
FIG. 1 is a perspective schematic illustration of the reconstruction of a three-dimensional model of a scene in accordance with the present invention.

A schematic perspective diagram that illustrates reconstruction of a three-dimensional model of a scene in accordance with the invention is shown in FIG. 1. Cameras 10, 12, 14, 16 and 18 acquire respective input images 20, 22, 24, 26 and 28 of a scene 30 from different camera viewpoints. The distance, location and orientation of each of cameras 10, 12, 14, 16 and 18 are known, and the images obtained are defined as calibrated images. The algorithms described below place no restrictions on the locations of the cameras. The cameras may be placed at arbitrary locations in and around the scene. Preferably, the cameras surround the scene. This configuration provides the most complete information about the scene and thereby provides the highest quality reconstruction of scene 30. In a practical situation, ten to forty images of the scene may be acquired from different viewpoints. For a stationary scene, the images may be acquired with the same camera at different times.

As described above, input images 20, 22, 24, 26 and 28 may be used to generate one or more new views, or images, of scene 30 from viewpoints that are different from the viewpoints of cameras 10, 12, 14, 16 and 18. The new view synthesis first requires reconstruction of a three-dimensional model of scene 30 from input images 20, 22, 24, 26 and 28. The three-dimensional model is then used to render one or more new images of scene 30. The voxel coloring algorithms of the present invention relate to reconstruction of a three-dimensional model of scene 30.

The present invention provides novel algorithms for volumetric scene reconstruction. Given a set of images of a scene taken from arbitrary but known locations, the algorithms build a 3D model of the scene that is consistent with the input images. The algorithms are called generalized voxel coloring, or GVC algorithms. The algorithms use voxels to model the scene and exploit the fact that surface points in a scene, and the voxels that represent them, project to consistent colors in the input images. Although voxel coloring and space carving are successful solutions to the scene reconstruction problem, the algorithms of the present invention have advantages over each of them. Unlike voxel coloring, the present invention allows input cameras to be placed at arbitrary locations in and around the scene. When checking the color consistency of a voxel, the present invention uses the entire set of images from which the voxel is visible. Space carving uses only a subset of those images. The resulting reconstructions yield better results in synthesizing new views.

Two variations of the generalized voxel coloring algorithm have been developed: GVC and GVC-LDI. The GVC-LDI algorithm is an enhancement of the basic GVC algorithm. The carving of one voxel potentially changes the visibility of other voxels. When an uncarved voxel's visibility changes, its color consistency should be reevaluated, and it too should be carved if it is then found to be color inconsistent. The GVC-LDI algorithm uses layered depth images (LDIs) to determine exactly which voxels have their visibility changed when another voxel is carved and thus can reevaluate exactly the right voxels. In the same situation, the GVC algorithm does not know which voxels need to be reevaluated and so reevaluates all voxels in the current model. Therefore, the GVC-LDI algorithm performs dramatically fewer color consistency evaluations than the GVC algorithm during a reconstruction. However, the GVC algorithm uses considerably less memory than the GVC-LDI algorithm. Both algorithms initially assume that all voxels are opaque. They carve color inconsistent voxels until all voxels that remain project onto consistent colors in the images from which they are visible.

Figure 4:
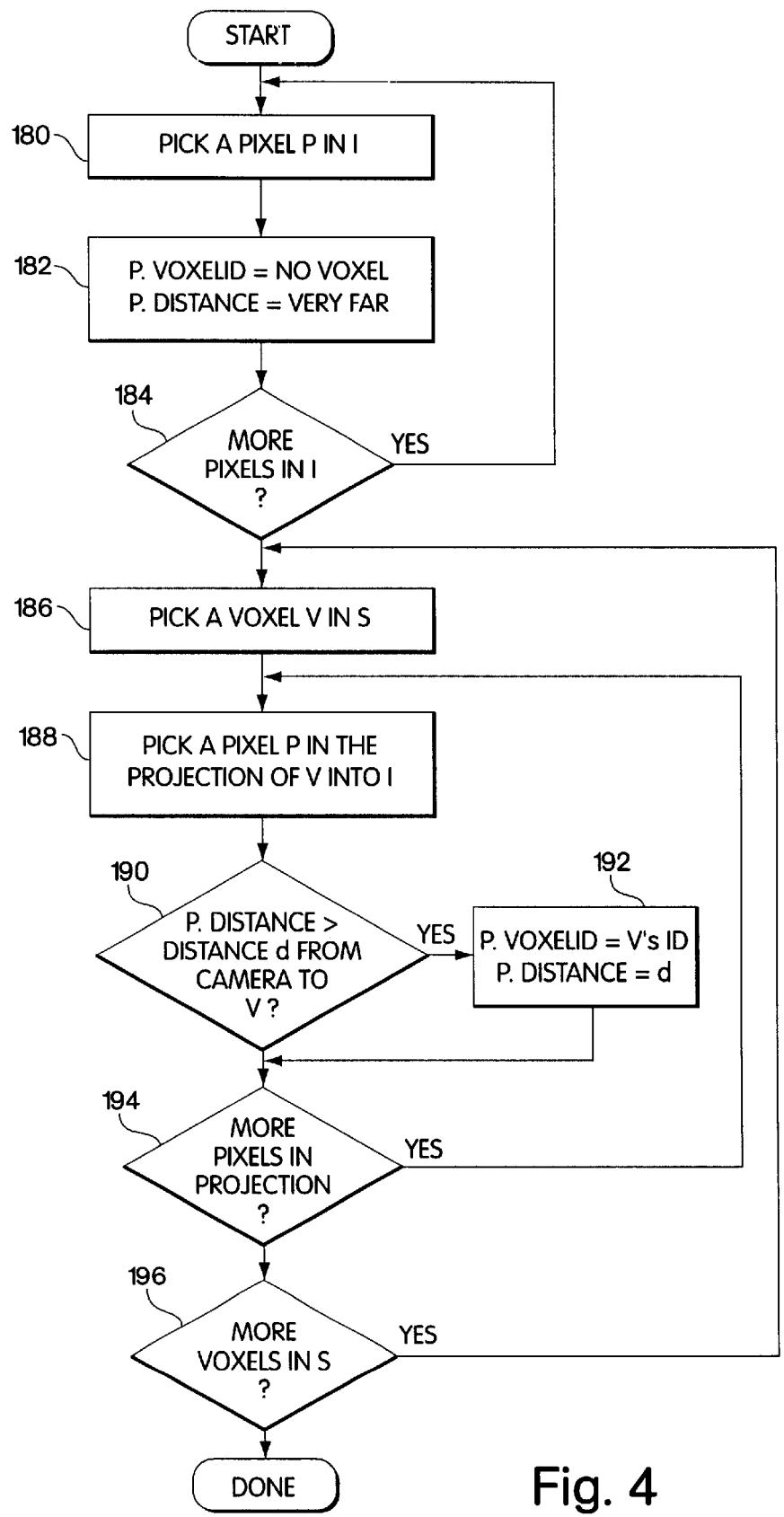
FIG. 4 is a flow chart that illustrates an example of the process shown in FIG. 2 for creating an item buffer.
Figure 5:
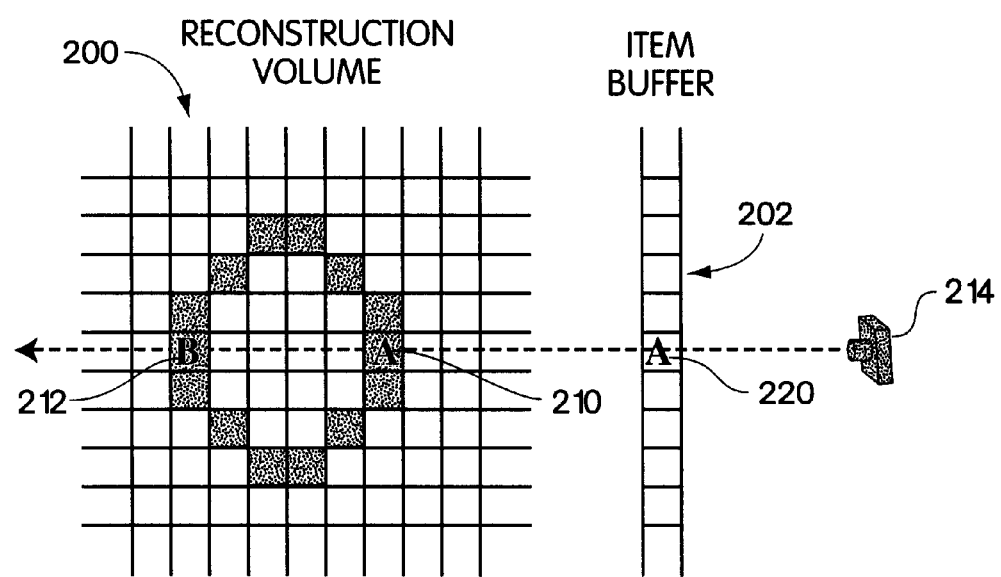
FIG. 5 is a schematic illustration of an example of an item buffer.

The generalized voxel coloring, or GVC, algorithm determines visibility as follows. First, every voxel is assigned a unique ID. Then, an item buffer is constructed for each image, as shown in FIGS. 4 and 5 as described below. A standard Z-buffered rendering of all the opaque voxels is performed but, instead of storing voxel colors at each pixel, voxel IDs are stored. Thus, after the voxels have been rendered, each pixel in the item buffer contains the ID of the closest opaque voxel that projects onto it. This is exactly the visibility information that is needed.

Figure 6:
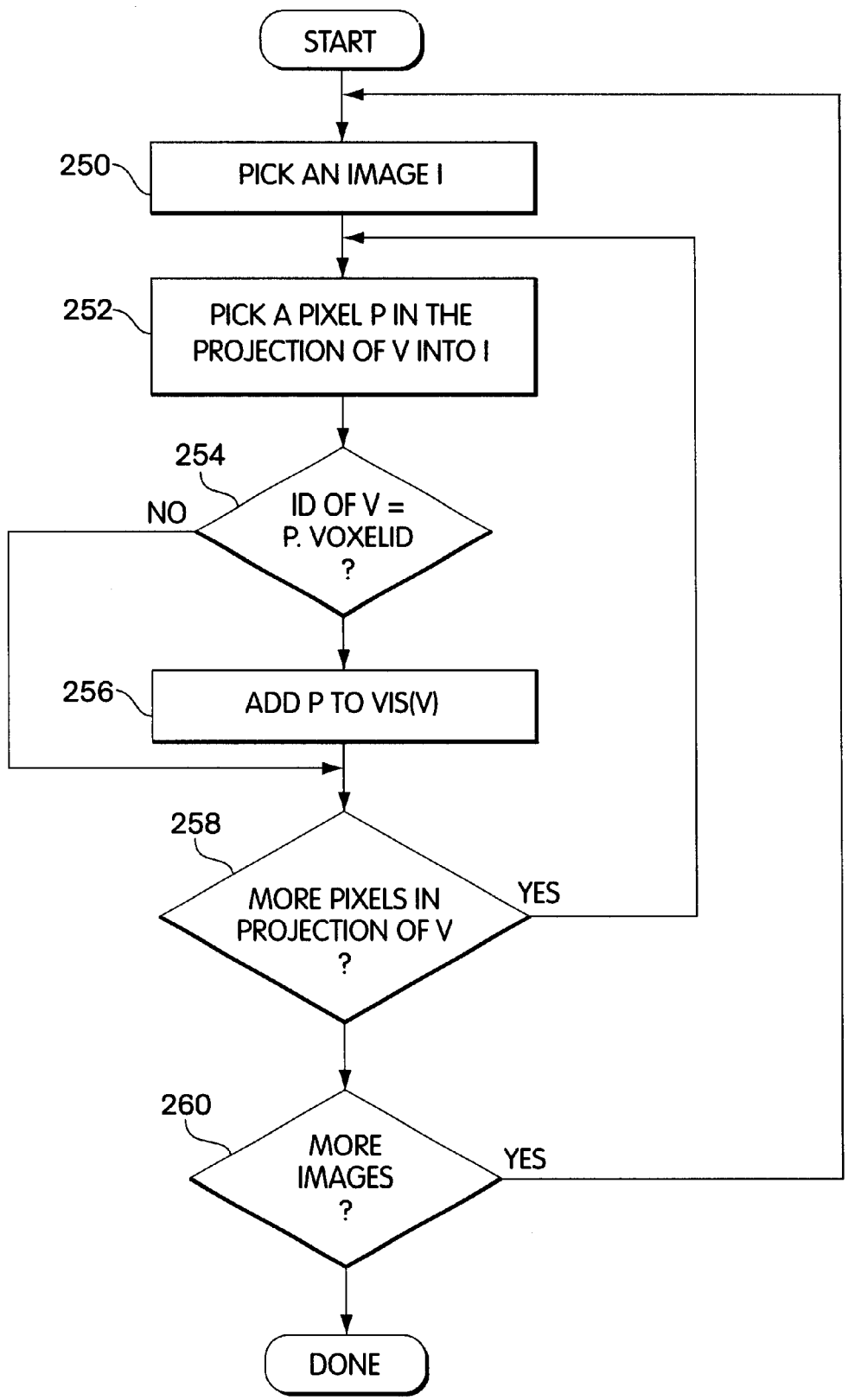
FIG. 6 is a flow chart that illustrates an example of the process shown in FIG. 2 for computing vis(V)

After valid item buffers have been computed for each of the images, it is possible to compute a set vis(V) of all pixels from which the voxel V is visible, as shown in FIG. 6 and described below. Vis(V) is computed as follows. Voxel V is projected into each image. For every pixel P in the projection of voxel V, if the item buffer for pixel P contains the ID of voxel V, then pixel P is added to vis(V). To check the color consistency of a voxel V, a consistency function consist () is applied to vis(V), i.e., consist (vis(V)) is computed.

Since carving a voxel changes the visibility of the remaining uncarved voxels, and since the item buffers are used to maintain visibility information, the item buffers need to be updated periodically. The GVC algorithm does this by recomputing the item buffers. Since this process is time-consuming, the GVC algorithm is allowed to carve many voxels between updates of the item buffers. As a result, the item buffers are out of date much of the time, and the computed set vis(V) is only guaranteed to be a subset of all the pixels from which a voxel V is visible. However, since carving is conservative, no voxels will be carved that should not be. During the final iteration of the GVC algorithm, no carving occurs, so the visibility information stays up-to-date. Every voxel is checked for a color consistency on the final iteration, so it follows that the final model is color consistent.

As carving progresses, each voxel is in one of three categories: 1) it has been found to be color inconsistent and has been carved; 2) it is on the surface of the set of uncarved voxels and has been found to be color consistent whenever it has been evaluated; or 3) it is surrounded by uncarved voxels, so it is visible from no images, and its color consistency is undefined.

An array of bits, one per voxel, is used to record which voxels have been carved. This data structure is called "carved" in the flow chart and is initially set to false for every voxel. A data structure called the "surface voxel list" (SVL) is used to identify the second category of voxels above. The SVL is initialized to the set of voxels that are not surrounded by other voxels. The item buffers are initialized, and subsequently updated, by rendering all the voxels on the SVL into them. The voxels in the third category above are called interior voxels. Though interior voxels are opaque, they do not need to be rendered into the item buffers because they are not visible from any of the images. When a voxel is carved, adjacent interior voxels become surface voxels and are added to the SVL. To avoid adding a voxel to the SVL more than once, a rapid means of determining if the voxel is already on the SVL is needed. A hash table is maintained for this purpose.

When the GVC algorithm has finished, the final set of opaque voxels may be recorded by saving the function carved (V). However, if it is desirable to save only voxels that are visible from the images, the item buffers may be used to identify the visible subset of the SVL. The entire SVL may be saved if a closed surface is desired.

Figure 2:
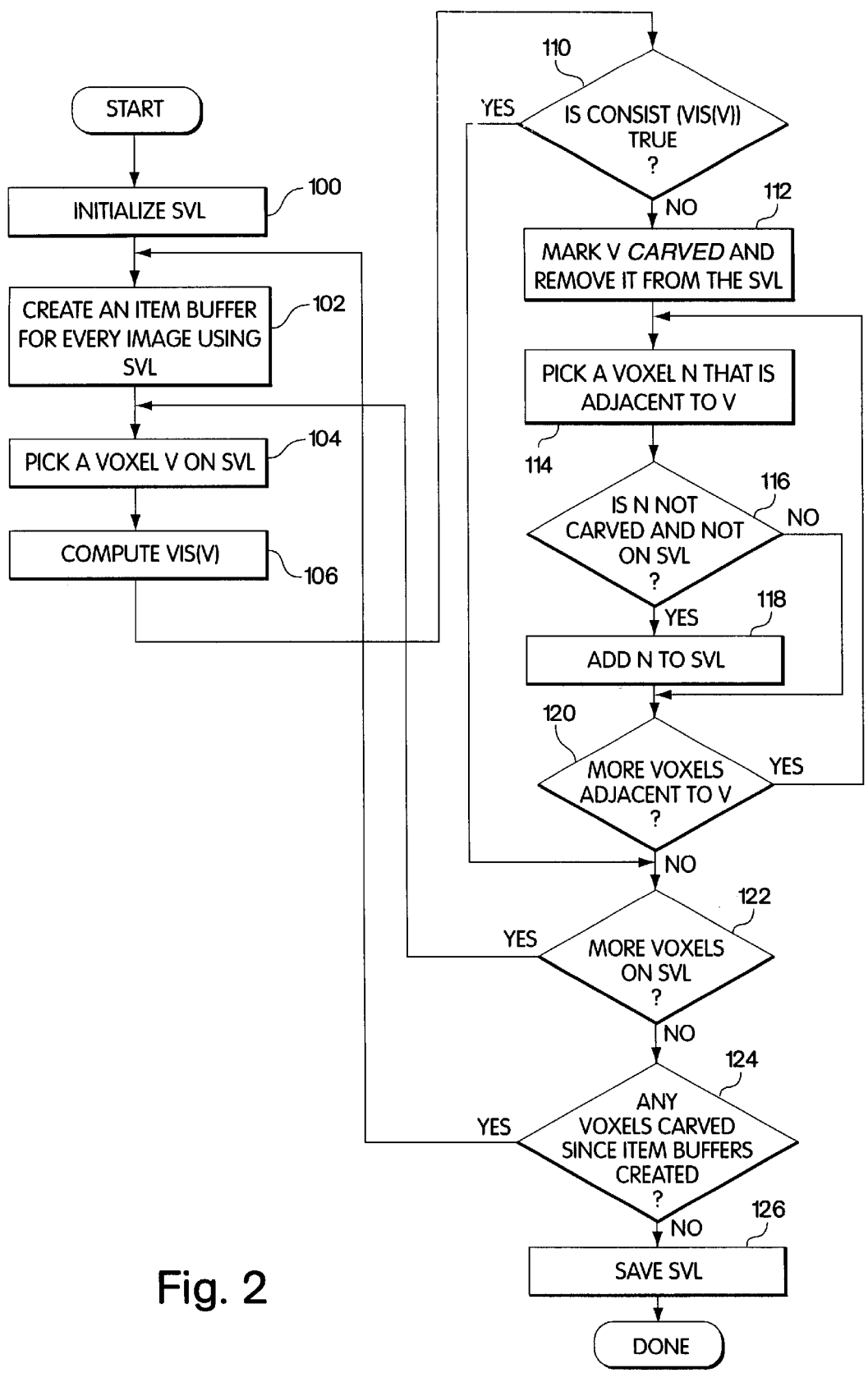
FIG. 2 is a flow chart that illustrates an example of a generalized voxel coloring algorithm utilizing item buffers in accordance with a first embodiment of the invention.

A flow chart of an example of the generalized voxel coloring algorithm in accordance with a first embodiment of the invention is shown in FIG. 2. Pseudo code corresponding generally to the flow chart of FIG. 2 is shown in FIG. 2A. In step 100, the surface voxel list (SVL) is initialized. As indicated above, the SVL is a list of uncarved (opaque) voxels on the surface of the voxel volume. It is assumed that a voxel volume has been selected and that a voxel ID has been assigned to each of the voxels in the voxel volume. The initial voxel volume is selected to contain the scene and is typically rectangular or cubical in shape. However, an arbitrarily shaped initial voxel volume may be utilized. A process for initializing the SVL is described below with reference to FIG. 3. The SVL changes as voxels are carved.

In step 102, an item buffer is created for each image using the SVL. The item buffer for each pixel contains the ID of the closest voxel that projects onto it and the distance from the closest voxel to the camera. A process for creating an item buffer is described below with reference to FIG. 4.

In step 104, a voxel on the SVL is selected, and vis(V) is computed in step 106. As indicated above, vis(V) is the set of all pixels in all the images from which voxel V is visible. A process for computing vis(V) is described below with reference to FIG. 6. In step 110, the color consistency of vis(V) is determined. As indicated above, vis(V) is the set of all pixels in the images from which voxel V is visible. In general, the color consistency of vis(V) is used to determine whether voxel V is an opaque voxel or a transparent voxel. An opaque voxel is part of the scene being reconstructed, whereas a transparent voxel is typically an empty portion of the scene. The color consistency determination is based on the fact that a point on a surface in the scene has the same or approximately the same color in all pixels from which the point is visible. By contrast, the colors of the pixels corresponding to a point not on a surface in the scene do not match, as might be expected when an empty volume is viewed from different directions. To determine the color consistency of vis(V), the colors of the pixels in vis(V) are added to a color mean variable and a color standard deviation variable. The color mean variable represents average color of the pixels in the projection of voxel V. The color standard deviation variable is a measure of the variation in color in the sets of pixels corresponding to voxel V across all images. The computed color standard deviation value is compared with a coloring threshold. In one approach, the coloring threshold is fixed. In another approach, the coloring threshold is a function of the mean of the color variations across the plurality of images as described in pending U.S. application Ser. No. 09/273,934, filed Mar. 22, 1999, which is hereby incorporated by reference. If the color standard deviation value is less than the coloring threshold, indicating that the colors are consistent in different projections of voxel V, then voxel V is considered to be opaque, and its color is set as the computed color mean value. Thus, the voxel color is set to the average color in the projections of voxel V. If the pixels in vis(V) are determined to be color consistent, the process proceeds to step 122. If the color standard deviation value is not less than the coloring threshold, the voxel V is marked as carved in step 112 and is removed from the SVL. A carved voxel is defined as one that is determined to be transparent.

When voxel V is carved, voxels adjacent to voxel V may become visible in one or more of the images. In step 114, a voxel N that is adjacent to voxel V is selected. If it is determined in step 116 that voxel N is not carved and is not on the SVL, then voxel N is added to the SVL in step 118. If a voxel N has been carved or is already on the SVL, the process proceeds to step 120. If it is determined in step 120 that there are more voxels adjacent to voxel V, the process returns to step 114 for processing of the next adjacent voxel. After all adjacent voxels have been processed, the process proceeds to step 122. If it is determined in step 122 that there are more voxels on the SVL, the process returns to step 104 for processing of the next voxel on the SVL. After all voxels in the SVL have been processed, a determination is made in step 124 as to whether any voxels have been carved since the item buffers were created. If voxels have been carved, the process returns to step 102 to create an updated item buffer for each image.

The GVC algorithm in the example of FIG. 2 processes all voxels on the SVL before creating updated item buffers for each image. It will be understood that updated item buffers can be created more frequently if desired. For example, updated item buffers can be created after processing a predetermined number of voxels or after processing a predetermined percentage of the voxels on the SVL. The frequency with which the item buffers are updated is a tradeoff between the time required for updating item buffers and the undesirability of using out-of-date visibility information to process voxels. However, as noted above, no voxels will be carved that should not be.

Referring again to step 118, it is desirable, but not necessary, to avoid checking the color consistency of a voxel N that has become visible as the result of carving until the next iteration of the main processing loop. This may be achieved by inserting voxel N into the SVL at a point that has already been passed in the loop. Alternatively, voxel N may be added temporarily to a new SVL until completion of the current iteration and then copied into the SVL.

If it is determined in step 124 that no voxels have been carved since the item buffers were created, the SVL is saved in step 126. The SVL at this point contains a list of opaque surface voxels that accurately represent the scene.

Figure 3:
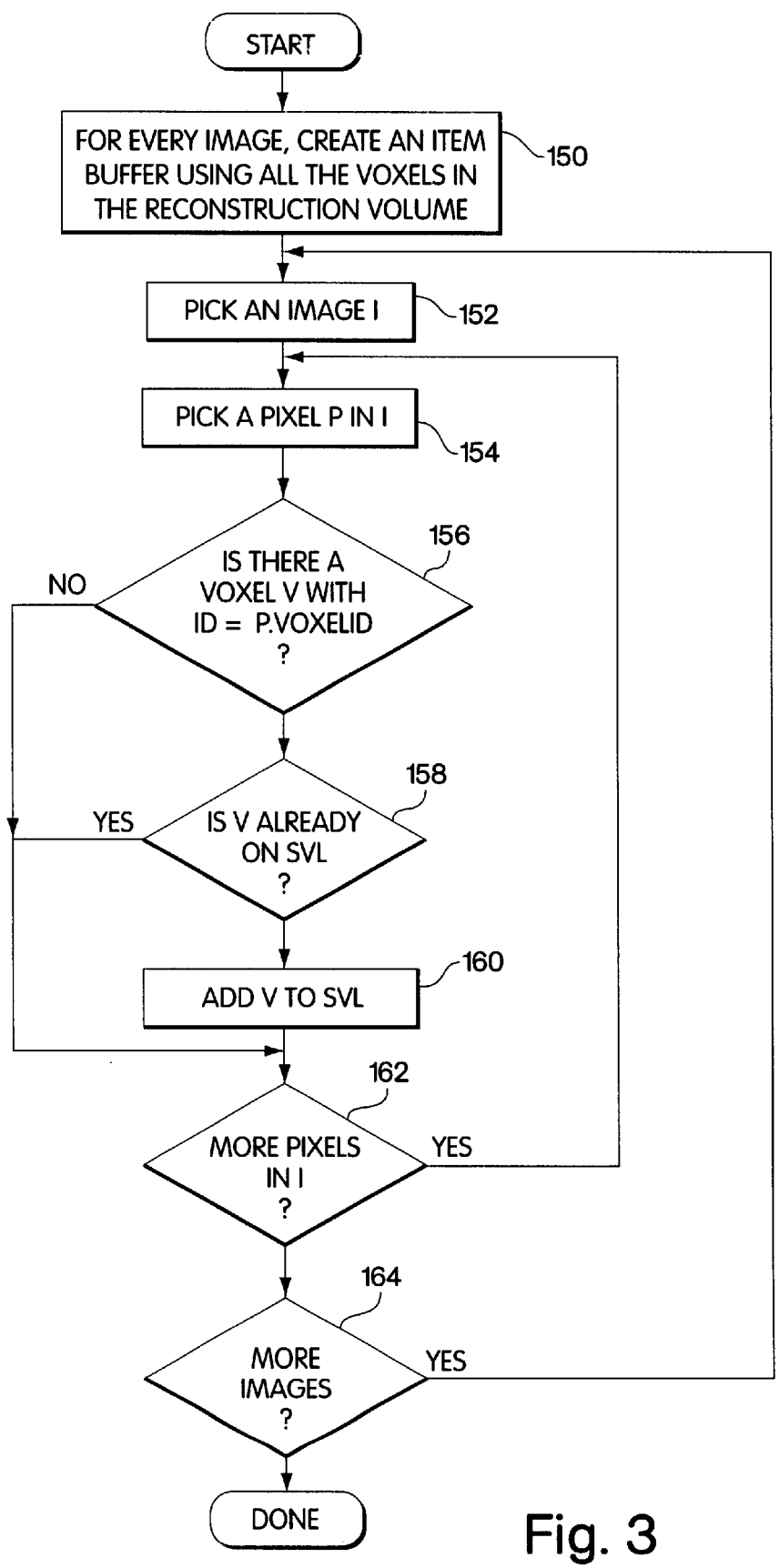
FIG. 3 is a flow chart that illustrates an example of the process shown in FIG. 2 for initializing the surface voxel list.

A process for initializing the SVL, which corresponds to step 100 in FIG. 2, is shown in FIG. 3. In step 150, an item buffer is created for every image using all the voxels in the reconstruction volume. As indicated above, the item buffer for each pixel contains the ID of the closest uncarved voxel that projects onto it. A process for creating an item buffer is described below in connection with FIG. 4. An image I is selected in step 152, and a pixel P in image I is selected in step 154. In step 156, a determination is made as to whether there is a voxel having an ID that matches P.voxel ID, which is the voxel ID contained in the item buffer for pixel P. If the item buffer for pixel P contains no voxel ID, the process proceeds to step 162. If the item buffer contains a voxel ID, a determination is made in step 158 as to whether voxel V is already on the SVL. If voxel V is already on the SVL, the process proceeds to step 162. If voxel V is not on the SVL, voxel V is added to the SVL in step 160. Step 162 causes the process to return to step 154 if there are more pixels in image I to be processed. Step 164 causes the process to return to step 152 if there are more images to be processed.

A process for creating an item buffer for an image I and a set of voxels S is shown in FIG. 4. The process of FIG. 4 is repeated for each image in step 102 of FIG. 2. In step 180, a pixel P in image I is selected. The item buffer for each pixel contains a voxel ID, P.voxel ID, and a voxel distance P.distance. In step 182, the voxel ID for pixel P is set to No Voxel, and the voxel distance is set to Very Far. If more pixels remain in image I, as determined in step 184, the process returns to step 180 for processing of the next pixel in image I. The loop including steps 180, 182 and 184 causes the item buffers for each of the pixels in image I to be reset. In step 186, a voxel V in the set of voxels S is selected, and a pixel P is selected in the projection of voxel V into image I in step 188. In step 190, a determination is made as to whether the distance P.distance contained in the item buffer for pixel P is greater than the distance from the camera to voxel V. If the answer is yes, indicating that voxel V is closer to the camera than the voxel in the item buffer, the voxel in the item buffer is replaced with voxel V in step 192. In particular, the value of P.voxel ID is set to the ID of voxel V, and the value of P.distance is set to the distance of voxel V. The process then proceeds to step 194. If it is determined in step 194 that there are more pixels in the projection of voxel V in image I, the process returns to step 188 for processing of the next pixel. If it is determined in step 196 that there are more voxels in the set of voxels S, the process returns to step 186 for processing of the next voxel. Following completion of the process of FIG. 4, the item buffers for image I contain the ID and distance from the camera for the closest voxel to each pixel.

A schematic illustration of an item buffer is shown in FIG. 5. To simplify the illustration, a reconstruction volume 200, normally three-dimensional, has been reduced to two dimensions. Similarly, an item buffer 202, which normally has a cell for each pixel in the corresponding 2D image, has been reduced to one dimension. Opaque voxels 210 and 212 are visible from a pixel P in an image obtained by a camera 214. Voxel 210 is closer to camera 214 than voxel 212. Accordingly, an item buffer location 220 for pixel P contains the ID, A, of voxel 210 and the distance of voxel 210. The item buffer contains similar information for all the pixels in the image.

A process for determining vis(V), which corresponds to step 106 in FIG. 2, is shown in FIG. 6. In step 250, an image I is selected, and a pixel P in the projection of voxel V into image I is selected in step 252. In step 254, a determination is made as to whether the ID of voxel V is the same as P.voxel ID contained in the item buffer for pixel P. If the ID of voxel V is contained in the item buffer for pixel P, pixel P is added to vis(V) in step 256. If the ID of voxel V is not contained in the item buffer for pixel P, the process proceeds to step 258. If there are more pixels in the projection of voxel V, as determined in step 258, the process returns to step 252 for processing of the next pixel. Otherwise, the process proceeds to step 260. If there are more images to be processed, as determined in step 260, the process returns to step 250 for processing of the next image. After completion of the process of FIG. 6, vis(V) contains the set of pixels in all the images from which voxel V is visible.

The GVC algorithm shown in FIG. 2 and described above computes visibility in a relatively simple manner that also makes efficient use of memory. However, the visibility information is relatively time-consuming to update. Therefore, the GVC algorithm updates visibility information infrequently, and the visibility information is out-of-date much the time. This does not lead to incorrect results but does result in inefficiency, because a voxel that would be evaluated as inconsistent using all the visibility information might be evaluated as consistent using a subset of the information. Ultimately, all the information is collected, but in the meantime voxels can remain uncarved longer than necessary and can therefore require more than an ideal number of consistency evaluations. Furthermore, the GVC algorithm reevaluates the consistency of voxels on the SVL even when their visibility (and hence their consistency) has not changed since their last evaluation. By using layered depth images instead of item buffers, the GVC-LDI algorithm efficiently and immediately updates the visibility information when a voxel is carved and also precisely determines the voxels whose visibility has changed.

Unlike the item buffers used by the GVC algorithm, which record at each pixel P only the closest voxel that projects on the pixel P, the LDIs store at each pixel P a list of all the surface voxels that project onto pixel P. These lists, which are called LDI(P), are sorted according to the distance of the voxel to the image's camera. The head of LDI(P) stores the voxel closest to pixel P, which is the same voxel that an item buffer would store. Since the information stored in an item buffer is also available in an LDI, vis(V) can be computed in the same way in both algorithms. The LDIs are initialized by rendering the SVL voxels into them.

Figure 7A:
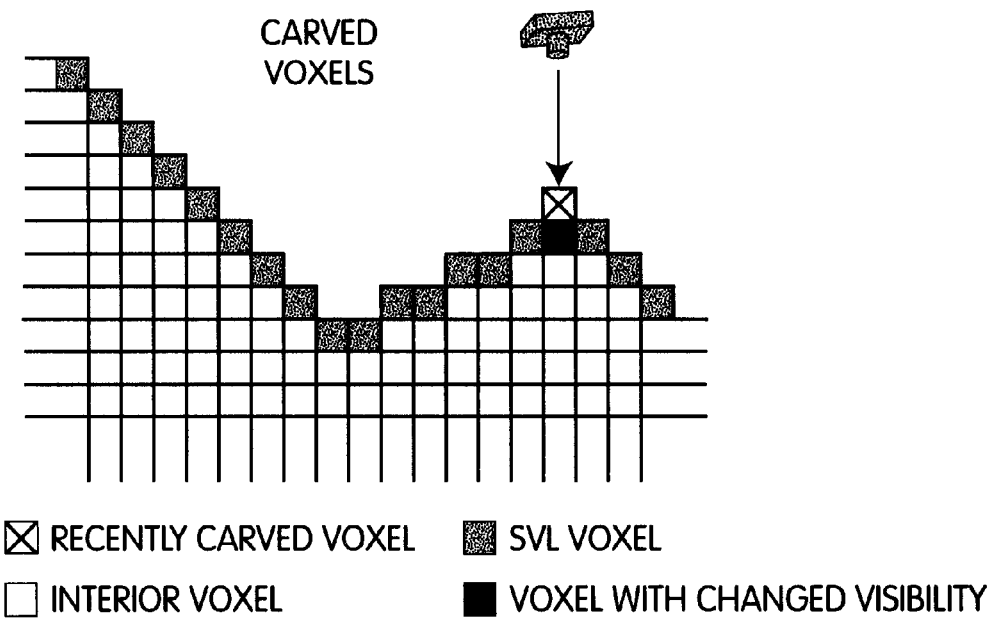
FIG. 7A is a schematic diagram that illustrates the change in visibility of an adjacent voxel when a voxel is carved.
Figure 7B:
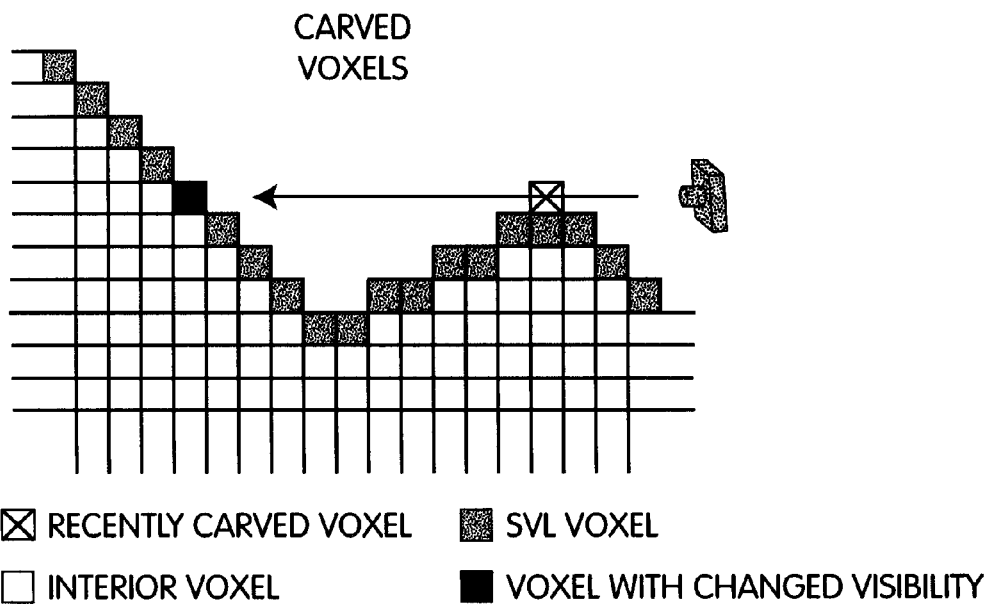
FIG. 7B is a schematic diagram that illustrates the change in visibility of a distant voxel when a voxel is carved.

The uncarved voxels whose visibility changes when another voxel is carved come from two sources: 1) interior voxels adjacent to the carved voxel become surface voxels when the carved voxel becomes transparent, as shown in FIG. 7A, and 2) the uncarved voxels are already surface voxels and hence are in the SVL and the LDIs, and may be distant from the carved voxel, as shown in FIG. 7B.

Voxels in the first category are trivial to identify, since they are next to the carved voxel. Voxels in the second category are impossible to identify efficiently in the GVC algorithm. Therefore, that algorithm must repeatedly evaluate the entire SVL for color consistency. In the GVC-LDI algorithm, voxels in the second category can be found easily with the aid of LDIs. They are the second voxel on LDI(P) for some pixel P in the projection of the carved voxel. The GVC-LDI algorithm keeps a list of the SVL voxels whose visibility has changed, called the changed visibility SVL (CVSVL). These are the only voxels whose color consistency must be checked. Carving is finished when the CVSVL is empty.

When a voxel is carved, the LDIs (and hence the visibility information) can be updated immediately and efficiently. The carved voxel can be deleted from LDI(P) for every pixel P in its projection. The same process automatically updates the visibility information for the second category of uncarved voxels whose visibility has changed. These voxels move to the head of LDI lists from which the carved voxel has been removed, and they are also added to the CVSVL. Interior voxels adjacent to the carved voxel are pushed onto the LDI lists for pixels onto which they project. As a byproduct of this process, it is determined if the voxel is visible. If the voxel is visible, it is put on the CVSVL.

Figure 8:
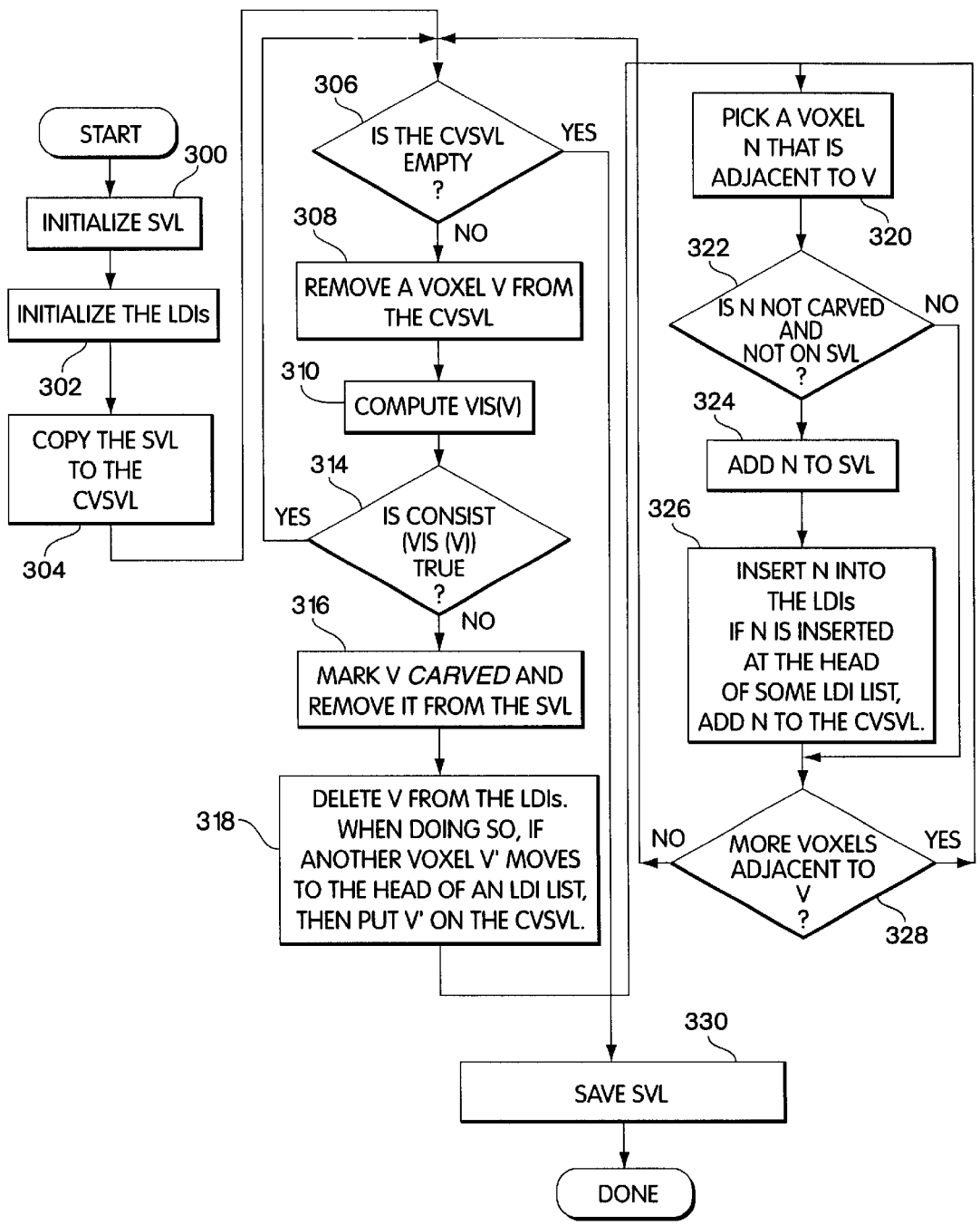
FIG. 8 is a flow chart that illustrates an example of a generalized voxel coloring algorithm utilizing layered depth images in accordance with a second embodiment of the invention.

A flow chart of an example of the GVS-LDI algorithm in accordance with a second embodiment of the invention is shown in FIG. 8. Pseudo code corresponding generally to the flow chart of FIG. 8 is shown in FIG. 8A. In step 300, the SVL is initialized. As described above, the SVL contains a list of uncarved surface voxels. The SVL may be initialized as shown in FIG. 3 and described above.

In step 302, the LDIs are initialized. The LDIs contained an ordered list of opaque voxels that are visible from each pixel. A process for initializing the LDIs is described below with reference to FIG. 9.

In step 304, the SVL is copied to the changed visibility SVL, or CVSVL. If it is determined in step 306 that the CVSVL is not empty, a voxel V is removed from the CVSVL in step 308, and vis(V) is computed in step 310. As described above, vis(V) is the set of pixels in all the images from which voxel V is visible. Vis(V) may be computed as described above in connection with FIG. 6.

In step 314, the color consistency of vis(V) is determined as described above in connection with FIG. 2. If vis(V) is color consistent, indicating an opaque voxel, the process returns to step 306 for processing another voxel in the CVSVL.

If vis(V) is not color consistent, indicating a transparent voxel, voxel V is marked as carved and is removed from the SVL in step 316. In step 318, voxel V is deleted from all LDIs. If another voxel V' moves to the head of an LDI list, then voxel V' is put on the CVSVL.

In step 320, a voxel N that is adjacent to voxel V is selected. If voxel N is carved or is on the SVL, the process proceeds to step 328. If voxel N is not carved and is not on the SVL, voxel N is added to the SVL in step 324. In step 326, voxel N is inserted into the LDIs. A process for inserting voxels into the LDIs is described below with reference to FIG. 10. If voxel N is inserted at the head of any LDI list, voxel N is added to the CVSVL.

If there are more voxels adjacent to voxel V, as determined in step 328, the process returns to the step 320 for processing the next adjacent voxel. When it is determined in step 328 that there are no more voxels adjacent to voxel V, the process proceeds to step 306 for processing the next voxel on the CVSVL. When the CVSVL is determined in step 306 to be empty, the process proceeds to step 330, and the SVL is saved.

Figure 9:
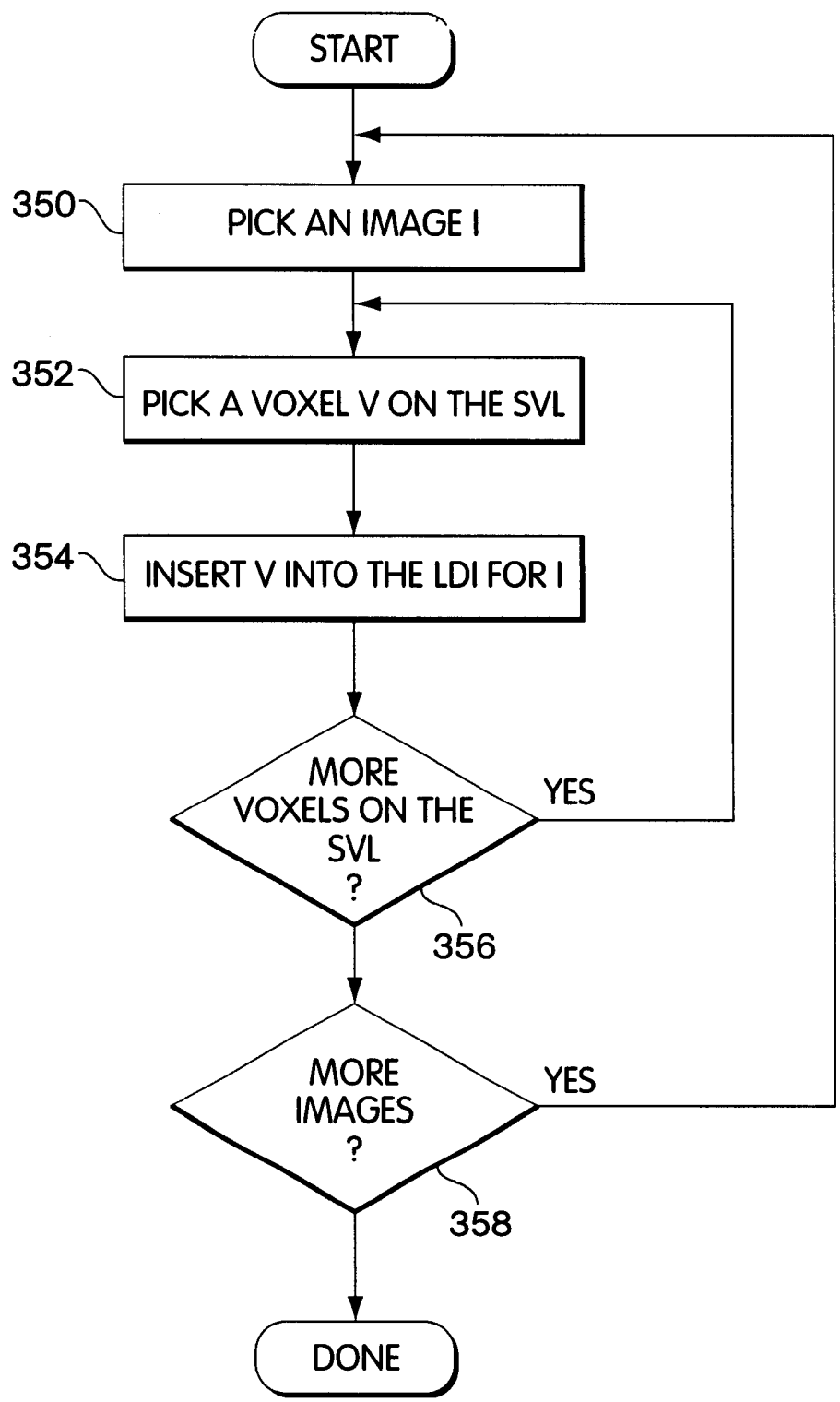
FIG. 9 is a flow chart that illustrates an example of the process shown in FIG. 8 for initializing the layered depth images.

A process for initializing the LDIs, which corresponds to step 300 in FIG. 8, is shown in FIG. 9. An image I is selected in step 350, and a voxel V on the SVL is selected in step 352. Voxel V is inserted into the LDI for image I in step 354. The insertion of a voxel V into the LDI is described below with reference to FIG. 10. If there are more voxels on the SVL, as determined in step 356, the process returns to step 352 for processing of the next voxel. When all voxels on the SVL have been inserted into the LDI for image I, the process proceeds to step 358. If there are more images, as determined in step 358, the process returns to step 350 for processing of the next image. Following step 358, the voxels on the SVL have been rendered to the LDIs for all of the images.

Figure 10:
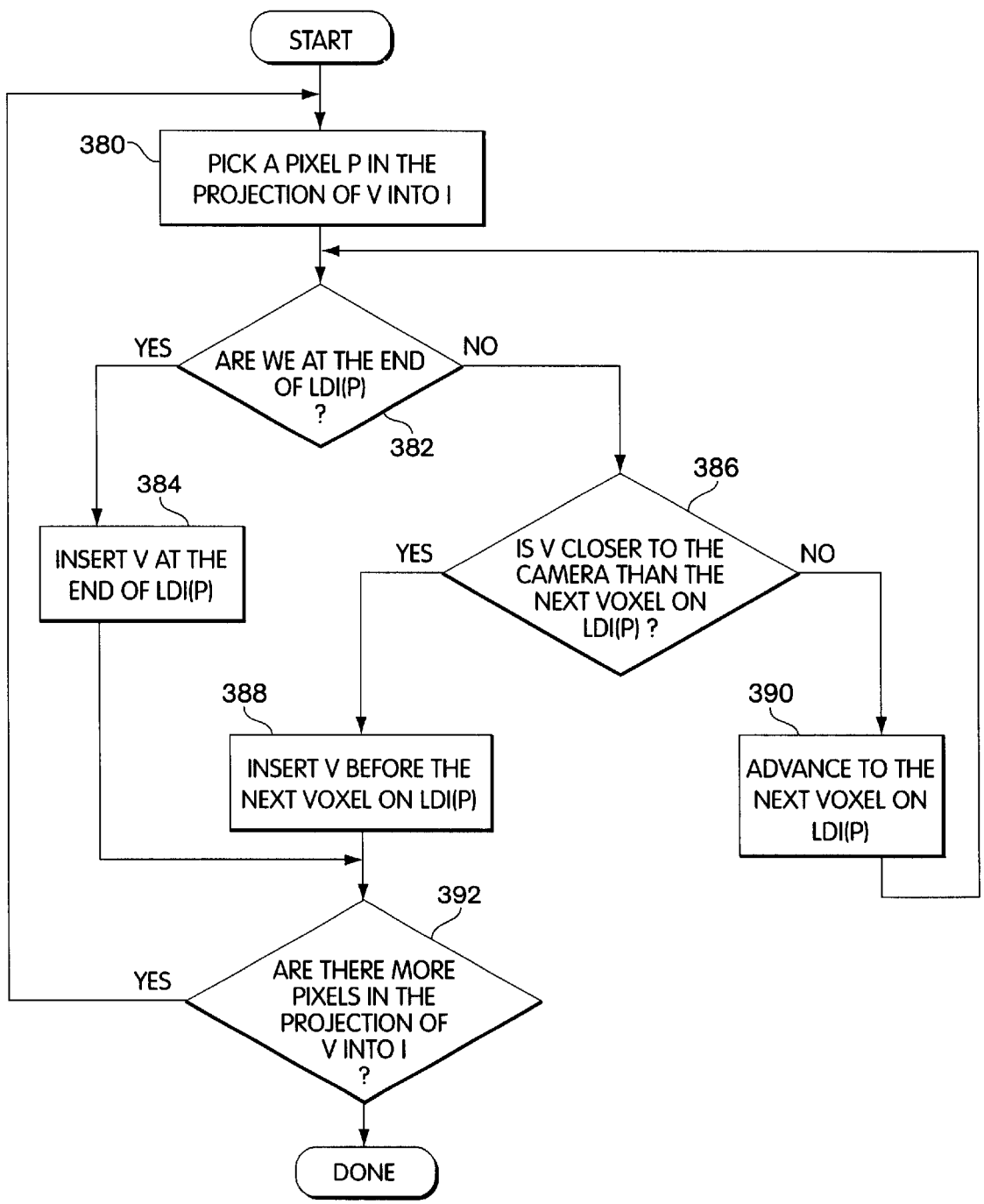
FIG. 10 is a flow chart that illustrates an example of the process shown in FIG. 9 for inserting a voxel into the layered depth image.

A process for inserting a voxel V into the LDI for an image I, which corresponds to step 326 in FIG. 8 and step 354 in FIG. 9, is shown in FIG. 10. In step 380, a pixel P in the projection of voxel V into image I is selected. In step 382, a determination is made as to whether the process is currently at the tail end (farthest from the camera) of LDI(P). If the process is at the tail end of LDI(P), voxel V is inserted at the tail end of LDI(P) in step 384. The process then proceeds to step 392. If it is determined in step 382 that the process is not at the tail end of LDI(P), a determination is made in step 386 as to whether voxel V is closer to the camera than the next voxel on LDI(P). If voxel V is closer to the camera than the next voxel on LDI(P), voxel V is inserted before the next voxel on LDI(P) in step 388. The process then proceeds to step 392. If it is determined in step 386 that voxel V is not closer to the camera than the next voxel on LDI(P), the process advances to the next voxel on LDI(P) in step 390 and returns to step 382. Following step 384 or step 388, a determination is made in step 392 as to whether there are more pixels in the projection of voxel V into image I. When there are more pixels in the projection of voxel V into image I, the process returns to step 380 for processing of the next pixel.

Figure 11:
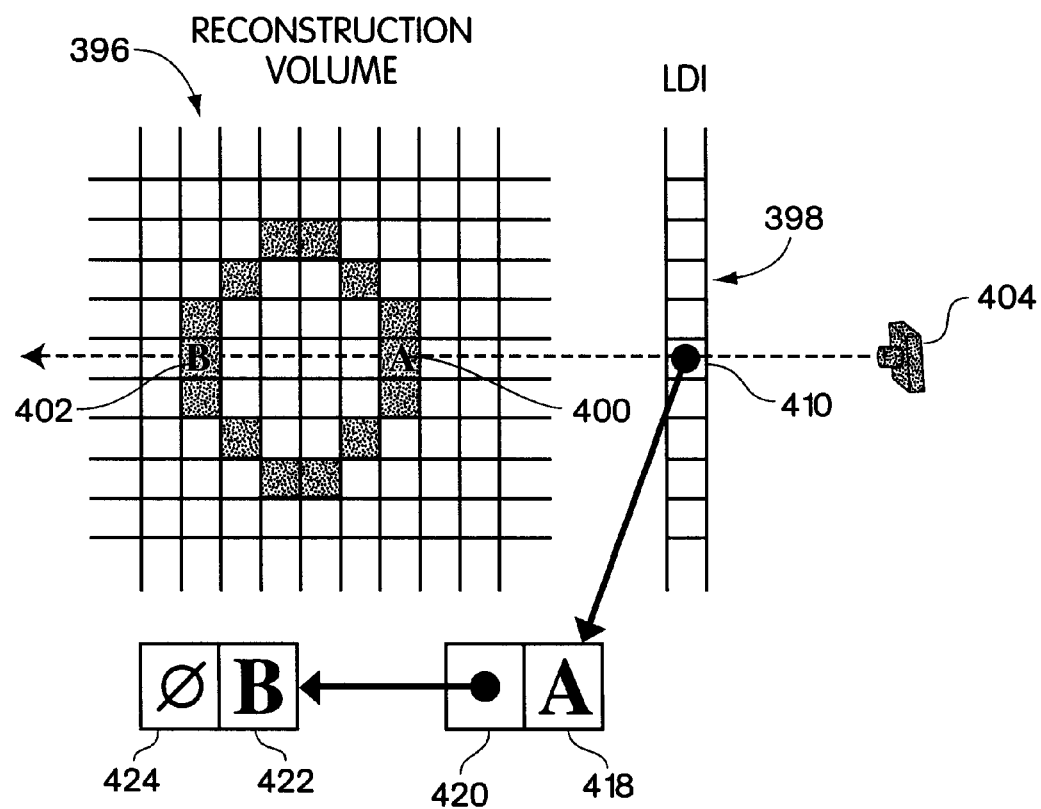
FIG. 11 is a schematic illustration of an example of a layered depth image.

An LDI is illustrated schematically in FIG. 11. To simplify the illustration, a reconstruction volume 396, normally three-dimensional, has been reduced to two dimensions. Similarly, an LDI 398, which normally has a cell for every pixel in the corresponding 2D image, has been reduced to one dimension. The LDI 398 stores visibility information corresponding to every pixel, but FIG. 11 shows only the information stored for one pixel. Opaque voxels 400 and 402 are visible from a pixel P in an image obtained by a camera 404. The LDI(P) 410 for pixel P contains an ordered list of opaque voxels that project to pixel P. Thus, a first location in LDI(P) 410 has an ID field 418 and link field 420; and a second location in LDI(P) 410 has an ID field 422 and a link field 424. ID field 418 contains the ID, A, of the closest opaque voxel 400, and link field 420 contains a pointer to the second location. ID field 422 contains the ID, B, of the second closest opaque voxel 402, and link field 424 contains a value that indicates the end of the list. In the example of FIG. 11, LDI(P) is implemented as a linked list.

Figure 12:
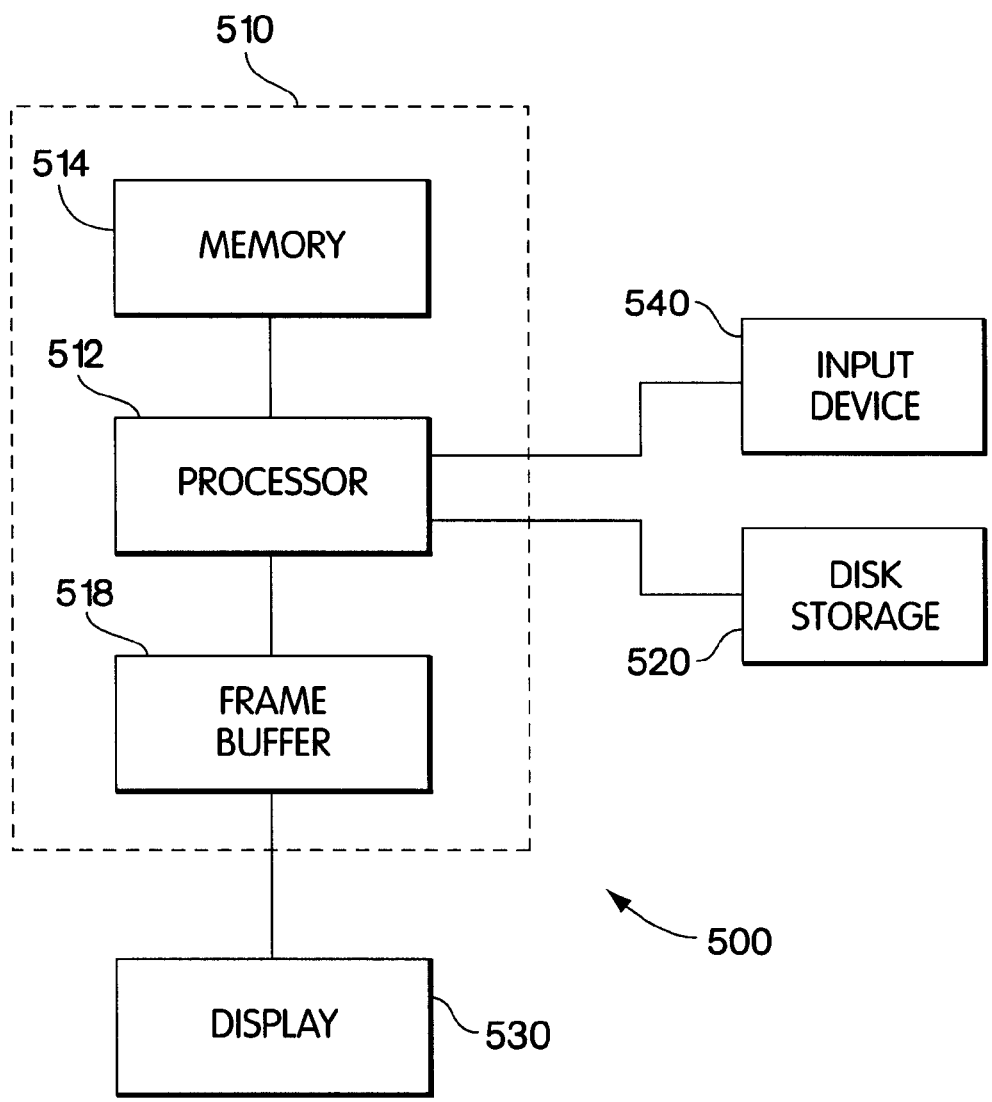
FIG. 12 is a block diagram of an example of a hardware configuration for implementing the present invention.

A block diagram of an example of a computer system 500 suitable for reconstructing a three-dimensional model of a scene from a plurality of input images of the scene as described above is shown in FIG. 12. The computer system 500 includes a central processing unit (CPU) 510, a disk storage unit 520, a display 530 and an input device 540. The disk storage unit 520 is typically implemented using one or more hard disk drives. The input images for reconstructing the three-dimensional model of the scene may be stored in disk storage unit 520. The input device 540 may be implemented using a standard keyboard and pointing device, such as a mouse or a trackball.

The CPU 510 may include a processor 512, a memory 514 and a frame buffer 518 for storing an image to be displayed on the display 530. The processor 512 provides the primary processing capabilities of the computer system 500 and, for example, may be implemented using a model HP9000/J282, manufactured by Hewlett-Packard Company. The memory 514 is used for storage of program instructions and for storage of results of calculations performed by the processor 512. In a preferred embodiment, the memory includes 200 or more megabytes of RAM. The frame buffer 518 is a high speed buffer memory device capable of storing one frame of data for display 530. The software routines for performing reconstruction of a three-dimensional model of a scene in accordance with the invention may be implemented using the "C" programming language and may reside in memory 514 and/or disk storage unit 520. The computer program for reconstructing a three-dimensional model of a scene in accordance with the invention may be stored on a computer readable medium, such as magnetic disk, compact disk or magnetic tape, and may be loaded into the computer system 500 using an appropriate peripheral device, as known in the art. It will be understood that the hardware components identified above are given by way of example only and that the invention may be implemented in a variety of different computer systems.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A method for reconstructing a three-dimensional model of a scene from a plurality of images of the scene taken from different viewpoints, comprising the steps of:
    a) defining a reconstruction volume comprising a set of voxels that include the scene;
    b) initializing a surface voxel list (SVL) that includes uncarved voxels on the surface of the reconstruction volume;
    c) creating item buffers that contain, for each pixel in each of the images, the ID of the closest voxel that projects onto the pixel;
    d) processing each voxel V in the SVL by:
        d1) computing the set of pixels vis (V) in all the images from which voxel V is visible;
        d2) determining the color consistency of vis (V); and
        d3) if vis (V) is not color consistent,
            i) carving voxel V,
            ii) removing voxel V from the SVL; and
            iii) adding to the SVL all uncarved voxels N that are adjacent to voxel V and that are not on the SVL;
    e) if any voxels have been carved since the step of creating the item buffers, repeating steps c) and d); and
    f) if no voxels have been carved since the step of creating the item buffers, saving the SVL.

2. A method as defined in claim 1, wherein the step of initializing the SVL comprises the steps of:
    creating an item buffer for each image using the voxels in the reconstruction volume; and
    for each pixel P in each image, if there is a voxel V having an ID that matches the voxel ID in the item buffer for pixel P and if the voxel V is not already on the SVL, adding voxel V to the SVL.

3. A method as defined in claim 2 wherein the step of creating an item buffer for each image comprises the steps of:
    b1) initializing pixel locations in the item buffer for a selected image;
    b2) selecting a voxel in the reconstruction volume;
    b3) for each pixel in the projection of the selected voxel into the selected image, storing the ID and distance to the camera from the selected voxel in the item buffer if the distance to the camera from the selected voxel is less than the distance stored in the item buffer;

b4) repeating steps b2) and b3) for each voxel in the reconstruction volume; and b5) repeating steps b1)–b4) for each image.

4. A method as defined in claim 1 wherein the step of creating item buffers comprises the steps of:
- c1) initializing pixel locations in the item buffer for a selected image;
- c2) selecting a voxel in the SVL;
- c3) for each pixel in the projection of the selected voxel into the selected image, storing the ID and distance to the camera from the selected voxel in the item buffer if the distance to the camera from the selected voxel is less than the distance stored in the item buffer;
- c4) repeating steps c2) and c3) for each voxel on the SVL; and
- c5) repeating steps c1)–c4) for each image.

5. A method as defined in claim 1 wherein the step of adding uncarved voxels into the SVL comprises adding uncarved voxels into the SVL after all voxels on the SVL have been processed in a current iteration of step d).

6. A method as defined in claim 1 wherein the step of adding uncarved voxels to the SVL includes adding uncarved voxels into the SVL at locations where they will not be processed until the next iteration of step d).

7. A method as defined in claim 1, wherein the step of computing the set of pixels vis (V) comprises the step of adding each pixel P in the projection of voxel V into each of the images to vis (V) if the voxel ID in the item buffer for pixel P matches the ID of voxel V.

8. A method for reconstructing a three-dimensional model of a scene from a plurality of images of the scene taken from different viewpoints, comprising the steps of:
- a) defining a reconstruction volume comprising a set of voxels that include the scene;
- b) initializing a surface voxel list (SVL) that includes uncarved voxels on the surface of the reconstruction volume;
- c) creating layered depth images (LDIs) that contain, for each pixel in each of the images, a list of all surface voxels that project onto the pixel, sorted according to distance from the voxel to the image's camera;
- d) copying the SVL to a changed visibility SVL (CVSVL);
- e) while there are voxels on the CVSVL:
  - e1) selecting a voxel V on the CVSVL and removing voxel V from the CVSVL;
  - e2) computing the set of pixels vis (V) in all the images from which voxel V is visible;
  - e3) determining the color consistency of vis (V); and
  - e4) if vis (V) is not color consistent,
    - i) carving voxel V,
    - ii) removing voxel V from the SVL,
    - iii) deleting voxel V from the LSIs,
    - iv) if voxel V is at the head of LDI(P), adding the next voxel on LDI(P) to the CVSVL, and
    - v) processing each uncarved voxel N that is adjacent to voxel V by adding voxel N to the CVSVL if its visibility has changed and inserting voxel N into the LDIs; and
- f) when the CVSVL is empty, saving the SVL.

9. A method as defined in claim 8, wherein the step of initializing the SVL comprises the steps of:
- creating an item buffer for each image using the voxels in the reconstruction volume; and
- for each pixel P in each image, if there is a voxel V having an ID that matches the voxel ID in the item buffer for pixel P and if the voxel V is not already on the SVL, adding voxel V to the SVL.

10. A method as defined in claim 9 wherein the step of creating an item buffer for each image comprises the steps of:
- b1) initializing pixel locations in the item buffer for a selected image;
- b2) selecting a voxel in the reconstruction volume;
- b3) for each pixel in the projection of the selected voxel into the selected image, storing the ID and distance to the camera of the selected voxel in the item buffer if the distance to the camera of the selected voxel is less than the distance stored in the item buffer;
- b4) repeating steps b2) and b3) for each voxel in the reconstruction volume; and
- b5) repeating steps b1)–b4) for each image.

11. A method as defined in claim 8 wherein the step of creating layered depth images comprises the steps of:
- c1) selecting an image from the plurality of images;
- c2) selecting a voxel on the SVL;
- c3) inserting the selected voxel into the layered depth image for all pixels in the projection of the selected voxel into the selected image according to distance from the selected voxel to the selected image's camera;
- c4) repeating steps c2) and c3) for each voxel on the SVL; and
- c5) repeating steps c1)–c4) for each of the images in the plurality of images.

12. A method as defined in claim 8, wherein the step of computing the set of pixels vis (V) comprises the step of adding each pixel P in the projection of voxel V into each of the images to vis (V) if the voxel ID in the first entry of LDI(P) for pixel P matches the ID of voxel V.

13. Apparatus for constructing a three-dimensional model of a scene from a plurality of images of the scene taken from different viewpoints, comprising;
- a storage unit for storing image data representative of the plurality of images of the scene; and
- a digital computer for processing the image data in said storage unit, said digital computer comprising;
  - a) means for defining a reconstruction volume comprising a set of voxels that include the scene;
  - b) means for initializing a surface voxel list (SVL) that includes uncarved voxels on the surface of the reconstruction volume;
  - c) means for creating item buffers that contain, for each pixel in each of the images, the ID of the closest voxel that projects onto the pixel;
  - d) means for processing each voxel V in the SVL by:
    - d1) computing the set of pixels vis (V) in all the images from which voxel V is visible;
    - d2) determining the color consistency of vis (V); and
    - d3) if vis (V) is not color consistent,
      - i) carving voxel V,
      - ii) removing voxel V from the SVL; and
      - iii) adding to the SVL all uncarved voxels N that are adjacent to voxel V and that are not on the SVL;
  - e) means for repeating the operations of creating item buffers and processing each voxel V in the SVL, if any voxels have been carved since the item buffers were created; and
  - f) means for saving the SVL, if no voxels have been carved since the item buffers were created.

14. Apparatus for reconstructing a three-dimensional model of a scene from a plurality of images of the scene taken from different viewpoints, comprising;

a storage unit for storing image data representative of the plurality of images of the scene; and a digital computer for processing the image data in said storage unit, said digital computer comprising:
 a) means for defining a reconstruction volume comprising a set of voxels that include the scene;
 b) means for initializing a surface voxel list (SVL) that includes uncarved voxels on the surface of the reconstruction volume;
 c) means for creating layered depth images (LDIs) that contain, for each pixel in each of the images, a list of all surface voxels that project onto the pixel, sorted according to distance from the voxel to the image's camera;
 d) means for copying the SVL to a changed visibility SVL (CVSVL);
 e) means for, while there are voxels on the CVSVL:
  e1) selecting a voxel V on the CVSVL and removing voxel V from the CVSVL;
  e2) computing the set of pixels vis (V) in all the images from which voxel V is visible;
  e3) determining the color consistency of vis (V); and
  e4) if vis (V) is not color consistent,
   i) carving voxel V,
   ii) removing voxel V from the SVL,
   iii) deleting voxel V from the LSIs,
   iv) if voxel V is at the head of LDI(P), adding the next voxel on LDI(P) to the CVSVL, and
   v) processing each uncarved voxel N that is adjacent to voxel V by adding voxel N to the CVSVL if its visibility has changed and inserting voxel N into the LDIs; and
 f) means for saving the SVL, when the CVSVL is empty.

* * * * *